United States Patent [19]

Fukumoto

[11] Patent Number: 4,890,735

[45] Date of Patent: Jan. 2, 1990

[54] APPARATUS FOR ACCOMMODATING BOX-LIKE ARTICLES

[75] Inventor: Masumi Fukumoto, Yokohama, Japan

[73] Assignee: Nifco Inc., Yokohama, Japan

[21] Appl. No.: 181,049

[22] Filed: Apr. 13, 1988

[30] Foreign Application Priority Data

| Apr. 13, 1987 | [JP] | Japan | 62-88725 |
| Apr. 13, 1987 | [JP] | Japan | 62-88726 |
| Apr. 13, 1987 | [JP] | Japan | 62-88727 |
| Apr. 13, 1987 | [JP] | Japan | 62-88728 |
| Apr. 13, 1987 | [JP] | Japan | 62-88729 |
| Apr. 13, 1987 | [JP] | Japan | 62-88730 |
| Aug. 4, 1987 | [JP] | Japan | 62-193699 |

[51] Int. Cl.$^4$ ............................. B65D 35/676
[52] U.S. Cl. ............................. 206/387; 206/1.5; 312/12; 312/319
[58] Field of Search ............ 206/1.5, 311, 312, 387, 206/309; 312/8, 9, 10, 15, 19, 107, 319, 12

[56] References Cited

U.S. PATENT DOCUMENTS

| 3,836,222 | 9/1974 | Kuntze | 312/319 |
| 4,216,857 | 8/1980 | Huang | 206/1.5 |
| 4,235,490 | 11/1980 | Schwartz et al. | 312/15 |
| 4,275,943 | 6/1981 | Gelardi et al. | 312/19 |
| 4,399,913 | 8/1983 | Gelardi et al. | 206/387 |
| 4,538,729 | 9/1985 | Ackeret | 206/387 |
| 4,640,415 | 2/1987 | Ackeret | 206/387 |
| 4,641,747 | 2/1987 | Mestdagh et al. | 206/309 |
| 4,655,344 | 4/1987 | Ackeret | 206/387 |

Primary Examiner—David T. Fidei
Attorney, Agent, or Firm—Oblon, Spivak, McClelland, Maier & Neustadt

[57] ABSTRACT

An apparatus for accommodating box-like articles includes a case open at least at the front for permitting a plurality of box-like articles (e.g., cassettes) to be slidably accommodated through the front opening independently of one another and in a plurality of rows disposed one above another. Compression springs independently forwardly urge the box-like articles accommodated in the case. A (e.g., heart-like cam groove and locking pin) lock the box-like articles in their retreated positions in the case against the biasing forces of the springs. A shoulder surface of the case, front edge of upper slide holder, upright surfaces of lower slide holder and rear wall surface of recessed portion stop the box-like articles such that those in a row partly project outwardly from the opening of the case to a smaller extent that those in the next lower row.

9 Claims, 12 Drawing Sheets

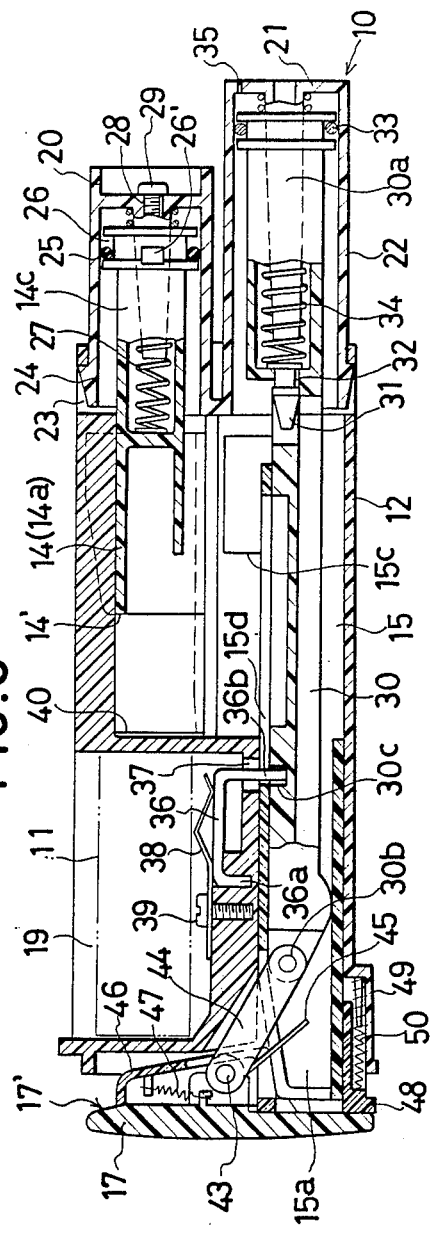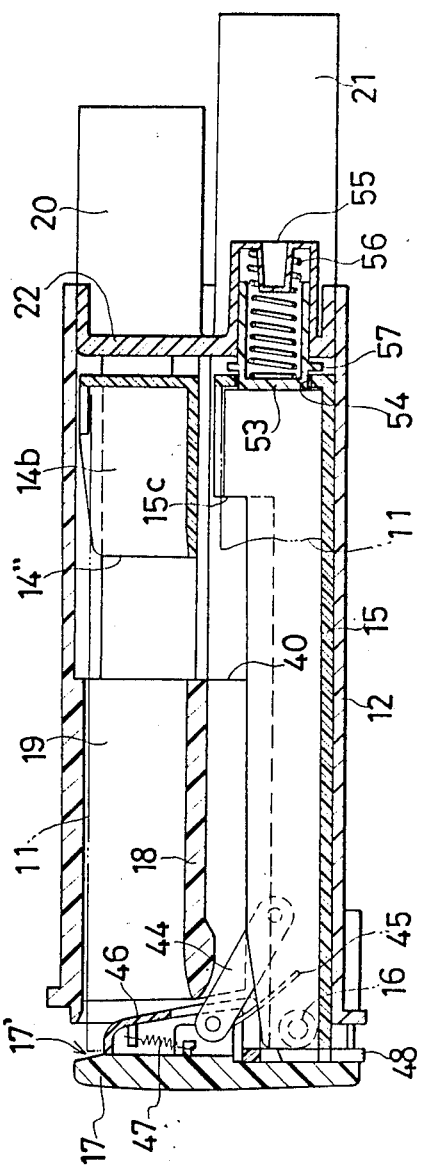

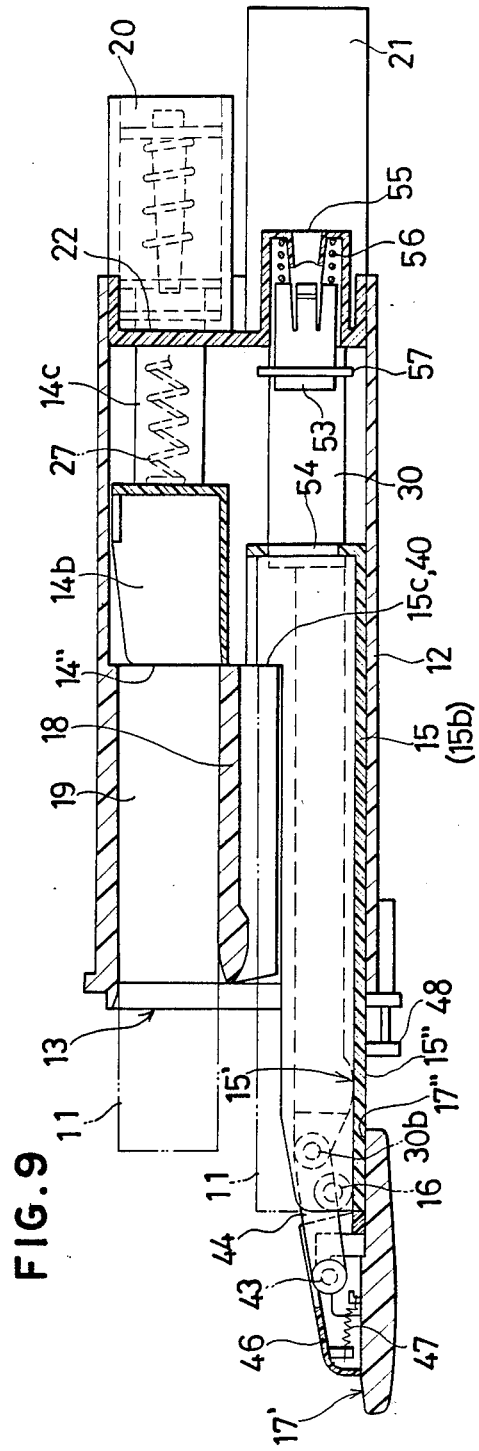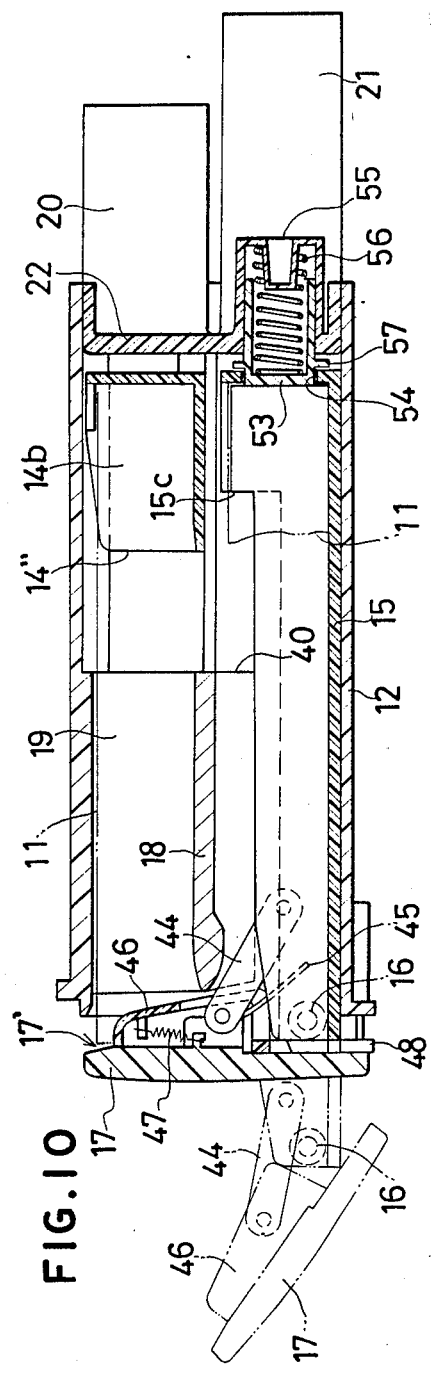
FIG.9
FIG.10

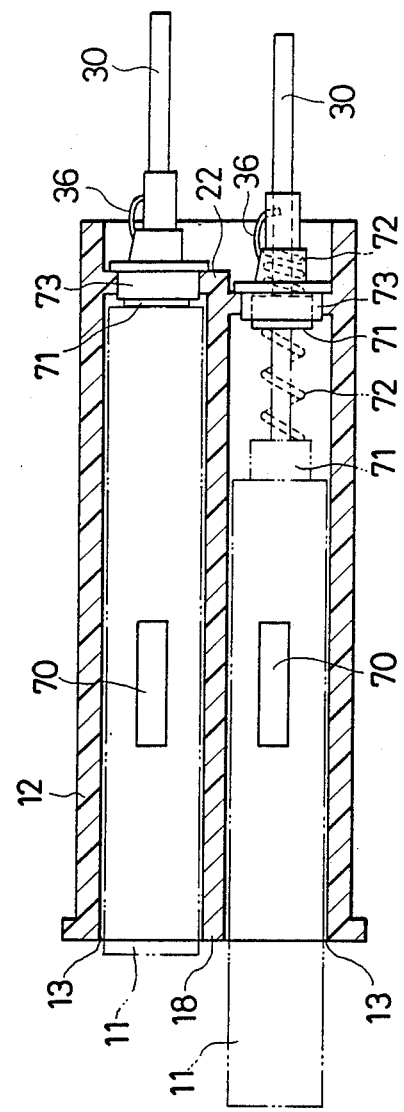

APPARATUS FOR ACCOMMODATING BOX-LIKE ARTICLES

BACKGROUND OF THE INVENTION

Field of the Invention

This invention relates to an apparatus for accommodating box-like articles, e.g., cassettes Related Art Statement FIGS. 1 and 2 show a prior art apparatus for accommodating cassettes which is installed in an automobile.

This prior art apparatus comprises a box-like case 1 open at the front, a plurality of partition members 3 depending from the upper wall of the case 1 and arranged in parallel and spaced apart a distance substantially equal to the thickness of cassettes 2 accommodated therein and leaf springs 4 each secured to the aforesaid upper wall between adjacent partition members 3 for downwardly urging each cassette 2. The case 1 is wholly accommodated in a lateral hole or recess 6 in a car center console panel.

In the prior art accommodation apparatus as noted above, adjacent cassettes 2 accommodated in the case 1 are spaced apart by a very small distance, so that it is rather difficult to take out a given cassette 2 because adjacent cassettes 2 hinder the removal.

Further, the cassettes 2 accommodated in the case 1 partly project from the front of the center console panel 5, which is not desirable from the standpoint of appearance. Further, the accommodated cassettes are liable to be flung out of the case 1 and scattered about when the car stops suddenly.

OBJECT AND SUMMARY OF THE INVENTION

An object of the invention is to provide an accommodation apparatus which permits an intended box-like article to be taken out readily and reliably.

Another object of the invention is to provide an accommodation apparatus from which accommodated articles are not flung out even under a strong shock.

A further object of the invention is to provide an accommodation apparatus which gives a high class impression.

To attain the above objects of the invention, there is provided an apparatus for accommodating box-like articles which comprises a base open at least at the front for permitting box-like articles to be slidably accommodated through the front opening, biasing means for forwardly urging the box-like articles accommodated in the case, and locking means for locking the box-like articles in retreated positions thereof in the case against the biasing forces of the biasing means, the box-like articles being released from the locked state when they are further pushed from the retreated positions.

To store a box-like article in the case, the article is pushed directly or indirectly into the depth of the case from the front opening thereof against the biasing force of the biasing means. As a result, the article is locked in a retreated position in the case by the locking means.

To take out an accommodated box-like article, the article is slightly pushed either directly or indirectly toward the depth of the case. This pushing operation has an effect of releasing the lock of the locking means. As a result, the article is pushed by the biasing force of the biasing means to be ejected outwardly from the front opening of the case. In this state, the article can be easily taken out of the case by grasping its portion projecting from the front opening of the case.

Further by closing the case front opening by turning a lid to an upright state, dust can no longer easily enter the case interior. Moreover, the appearance becomes good. Further, by providing air dampers for damping the sliding operation of articles and opening and closing operations of the lid, it is possible to provide a box-like article accommodation apparatus giving a high class impression.

The above and other objects and features of the invention will become more apparent from the following detailed description with reference to the accompanying drawings.

BRIEF DESCRIPTION OF THE DRAWINGS

FIG. 5 is a sectional view taken along line V—V in FIG. 4;

FIG. 6 is a sectional view taken along line VI—VI in FIG. 4;

FIG. 9 is a sectional view taken along line IX—IX in FIG. 7;

FIG. 10 is a sectional view for explaining opening and closing operations of the lid;

FIG. 20 is a sectional view illustrating another example of a case usable in the apparatus of FIG. 3.

DETAILED DESCRIPTION OF THE PREFERRED EMBODIMENT

Figure 1:
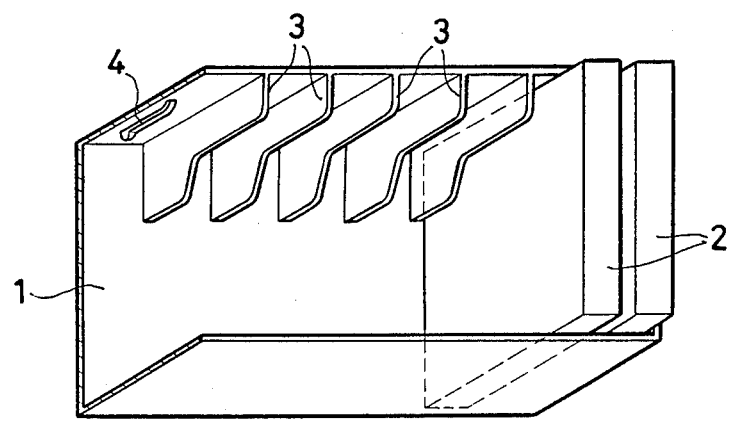
FIG. 1 is a perspective view, partly in section, showing a prior art apparatus for accommodating box-like articles.
Figure 2:
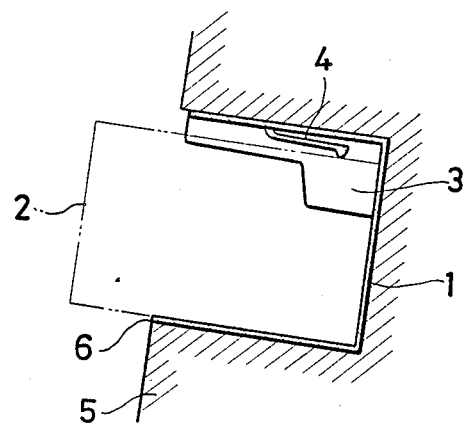
FIG. 2 is a sectional view showing the apparatus of FIG. 1 mounted in a car.

FIGS. 3 to 14 illustrate one embodiment of the apparatus for accommodating box-like articles according to the invention. Referring to the Figures, reference numeral 10 generally designates the apparatus. In this embodiment, the apparatus 10 is mounted in a motor car for accommodating cassettes 11 for cassette tapes.

Figure 3:
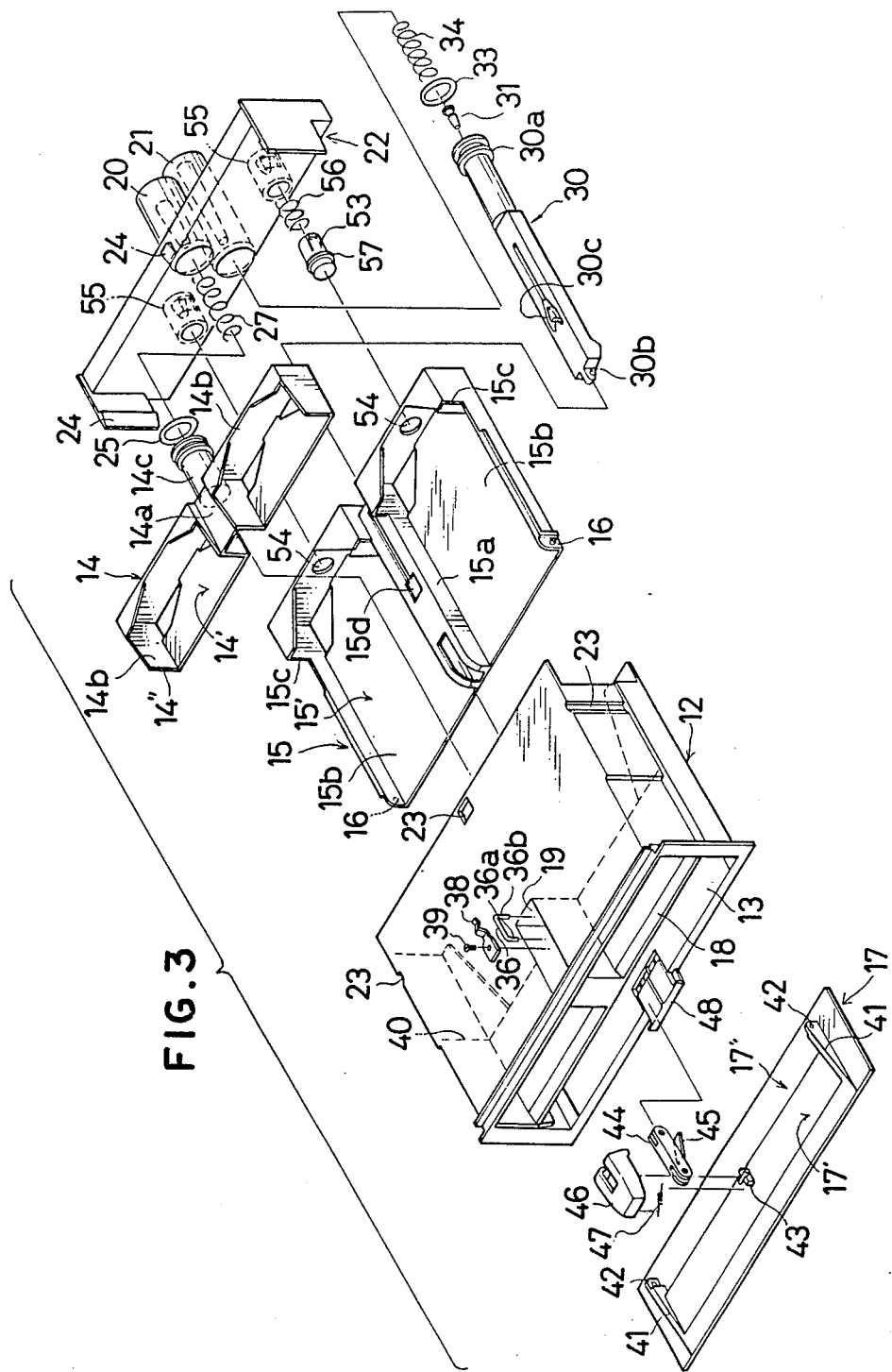
FIG. 3 is an exploded perspective view showing an embodiment of the apparatus for accommodating box-like articles according to the invention.

The apparatus 10 generally comprises, as shown in FIG. 3, a case 12 open at least at the front, upper and lower slide holders 14 and 15 slidably accommodated one above the other in the case 12 through the front opening 13 thereof and having respective support surfaces 14' and 15', on each of which two cassettes 11 can be supported side by side, and a lid 17 pivotally coupled by pins 16 to the front end of lower slide holder 15 for opening and closing the opening 13 of the case 12, the lid being turned down about the pins 16 into an open state.

Figure 7:
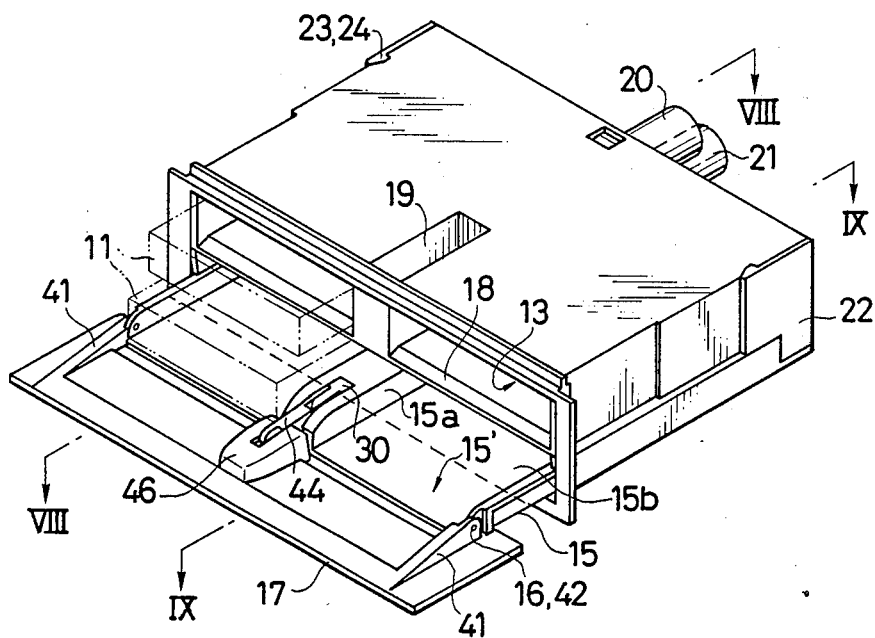
FIG. 7 is a perspective view showing the apparatus of FIG. 3 with a lid turned down into an open state.

The case 12 has a vertically flat box-like shape open at the front and also at the rear. It has a transversal partition wall 18 extending substantially midway of its height and toward its depth from the opening 13. The partition wall 18 defines an upper space and a lower space in the interior of the case 12. The top wall of the case 12 has a substantially central box-like recessed portion 19 open at the top. The upper space defined by the partition wall 18 is defined into a left space and a right space by the left and right side walls of the recessed portion 19, these left and right spaces each being capable of receiving a cassette 11 inserted therein (FIG. 7).

Figure 4:
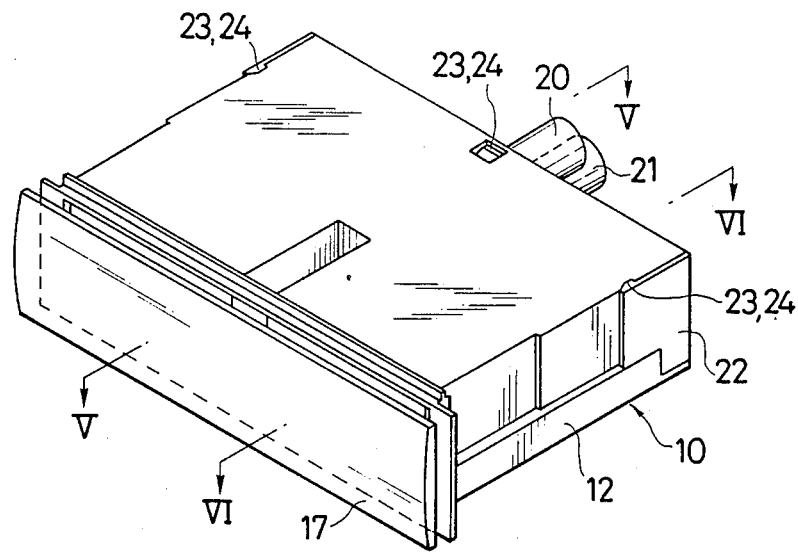
FIG. 4 is a perspective view showing the apparatus of FIG. 3 in an assembled state.
Figure 11:
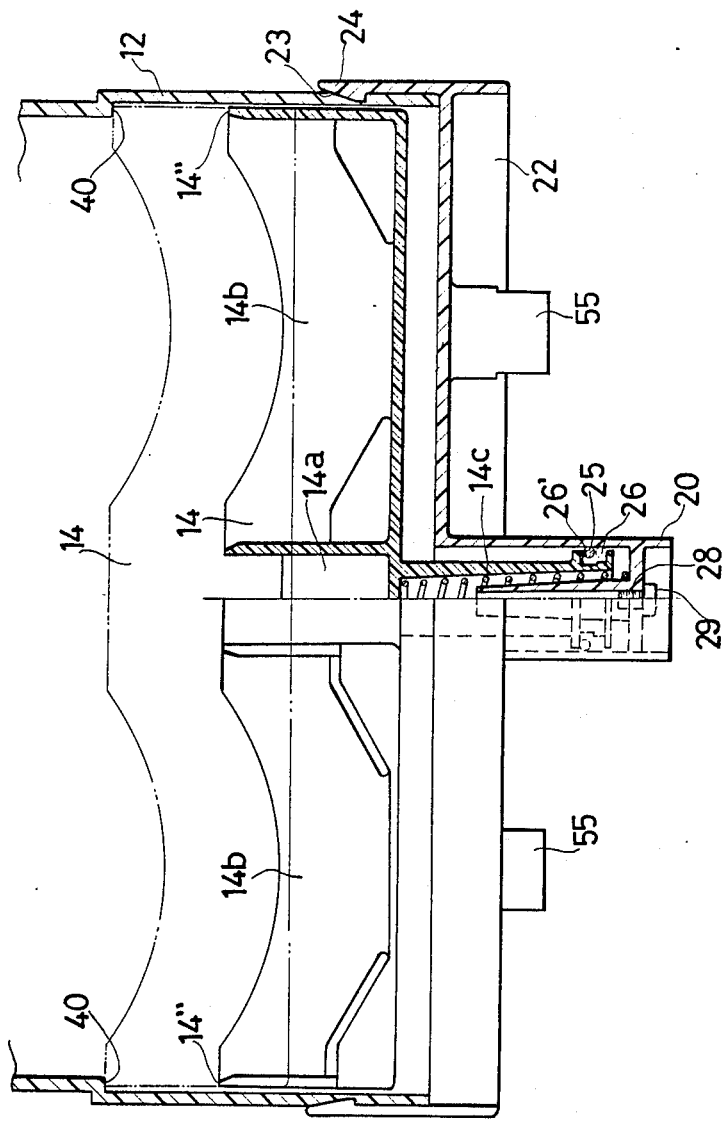
FIG. 11 is a plan view, partly in section, showing the relation between an upper slide holder and a case of the apparatus of FIG. 3.

The open rear end of the case 12 is covered by a cover member 22 having a pair of, i.e., upper and lower, cylinder portions 20 and 21 rearwardly projecting from a substantially central portion (FIGS. 4, 10 and 11). Either the case 12 or the cover 22 is provided with a recess 23 while the other is provided with a projection 24, so that the cover 22 can be mounted by a one-touch operation on the open rear end of the case 12 by the engagement of the recess 23 and projection 24 with each other. Of course the cover 22 can be removed by releasing the engagement of the recess 23 and projection 24.

Of the two slide holders 14 and 15, the upper slide holder 14, as shown in FIG. 3, integrally has a substantially central rectangular portion 14a, a pair of, i.e., left and right, holding portions 14b extending laterally from the opposite sides of the central rectangular portion 14a and a hollow piston portion 14c rearwardly projecting from the rectangular portion 14a.

As shown in FIGS. 5 and 11, the hollow piston portion 14c is inserted in the upper cylinder portion 20, these two portions constituting an air damper. Reference numeral 25 designates an O-ring fitted in an annular groove 26 formed in the piston portion 14c adjacent to an end thereof, numeral 27 a compression spring to be compressed between the piston and cylinder portions 14c and 20, numeral 28 an orifice formed in the cylinder portion 20, and numeral 29 a throttle screw screwed in the orifice 28. The annular groove 26 has a greater width than the O-ring and is provided with an exhausting passage 26' communicating with the interior of the piston portion 14c adjacent to the rear end thereof.

As shown in FIG. 3, the lower slide holder 15 integrally has a central hollow rectangular portion 15a open at the front and at the rear and a pair of, i.e., left and right, holding portions 15b extending laterally from the opposite sides of the hollow rectangular portion 15a. A piston rod 30 is slidably inserted in the hollow rectangular portion 15a.

Figure 12:
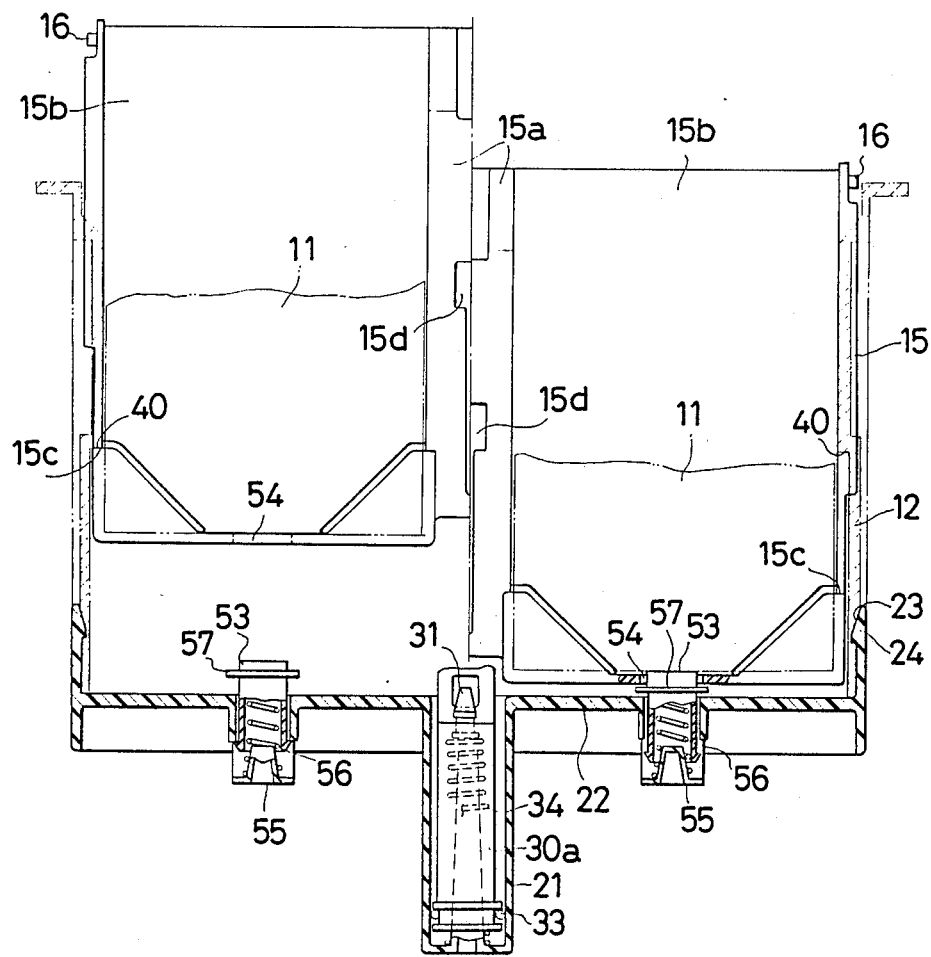
FIG. 12 is a plan view, partly in section, showing the relation between a lower slide holder and the case of the apparatus shown in FIG. 3.

The piston rod 30 is a one-piece plastic molding elongate in the longitudinal direction. It has a heart-like cam groove 30c formed in an intermediate portion of its length and constituting part of locking means and also has a hollow piston portion 30a adjacent to its rear end, the piston portion 30a being inserted in the lower cylinder portion 21, these piston and cylinder portions constituting another air damper (FIGS. 5, 12). Reference numeral 31 designates a check valve for opening and closing an exhausting hole 32 formed in the hollow piston portion 30a, numeral 33 an O-ring fitted on the outer periphery of the piston portion 30a, numeral 34 a compression spring to be compressed between the piston and cylinder portions 30a and 21, and numeral 35 an orifice formed in the cylinder portion 21.

Figure 8:
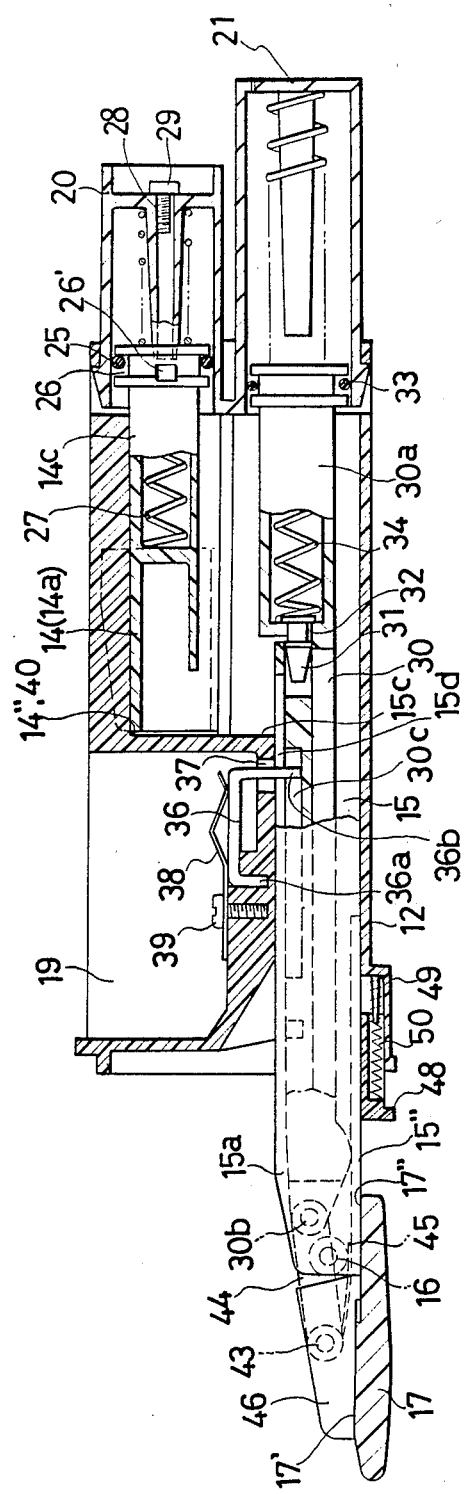
FIG. 8 is a sectional view taken along line VIII—VIII in FIG. 7.

The front end of the piston rod 30, as shown in FIG. 3, constitutes a pin section 30b having a pair of, i.e., left and right, pins. The heart-like cam groove 30c formed in the upper surface of an intermediate portion of the piston rod 30 in the length thereof co-operates with a locking pin 36 provided on the case 12, the cam groove 30c and locking pin 36 together constituting locking means. The locking pin 36, as shown in FIG. 3, is formed by bending a metal wire into a substantially U-shaped form. It has a comparatively short stem portion 36a and a comparatively long tracing portion 36b. As shown in FIGS. 5 and 8, the stem portion 36a of the locking pin 36 is inserted in a hole formed in the bottom of the recessed portion 19 of the case 12 and secured thereto. The tracing portion 36b of the locking pin 36 penetrates a through hole 37 formed in the bottom of the recessed portion 19 and a slot 15d formed in the central hollow rectangular portion 15a of the lower slide holder 15. Its free end extends into the cam groove 30c of the piston rod 30. As the piston rod 30, and hence the cam groove 30c, is moved back and forth, the free end of the tracing portion 36b completes an excursion along the cam groove 30c while swinging to the left and right about the stem portion 36a, whereby the lower slide holder 15 is released from locking. The locking pin 36 is retained from above by a retaining leaf spring 38 so that the free end of the tracing portion 36b is reliably held in the bottom of the cam groove 30c. An end of the retaining leaf spring 38 is secured by a screw 39 to the bottom of the recessed portion 19.

The locking means consisting of the combination of the cam groove 30c and locking pin 36 releases the locked state in response to an operation of pushing the lid 17 as will be described later in detail.

When the lower slide holder 15 etc. experiences a strong shock, as when the car suddenly stops, the locking means is liable to erroneously release the locked state. In such a case the lower slide holder 15 will be projected to fling out the accommodated articles. Therefore, the locking means is provided with safety means for preventing the erroneous operation. Such locking means will now be described with reference to FIGS. 15 to 19.

Figure 16:
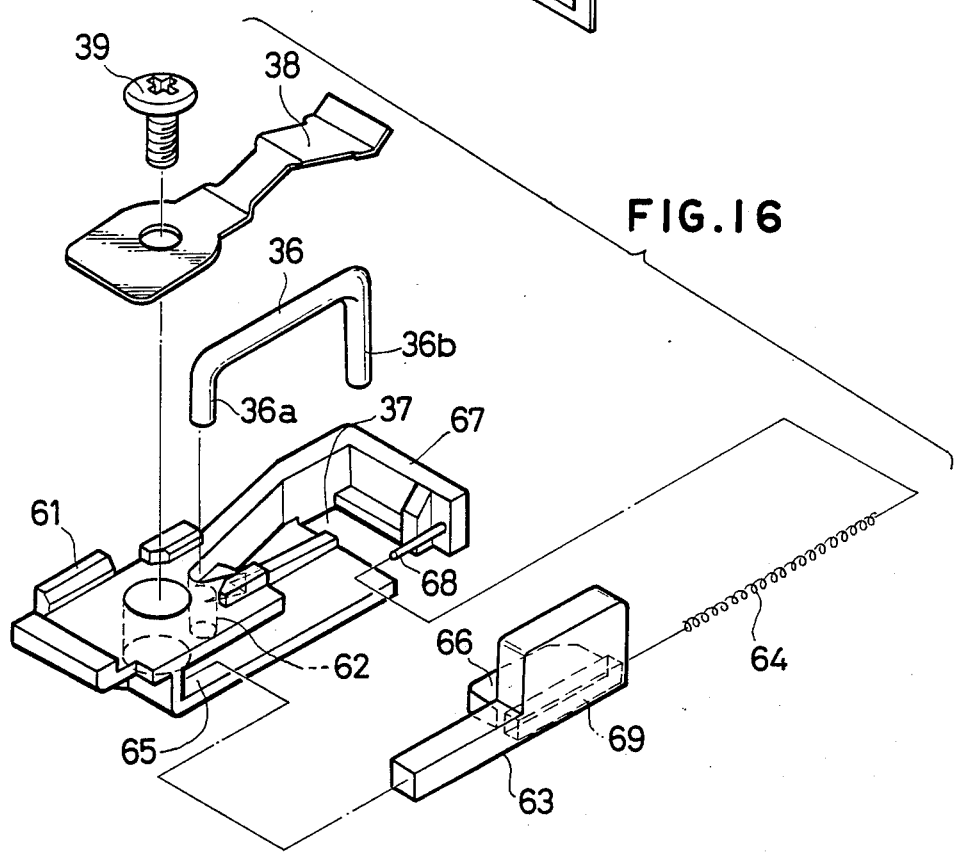
FIG. 16 is a perspective view showing a different example of locking means of the apparatus according to the invention.
Figure 18:
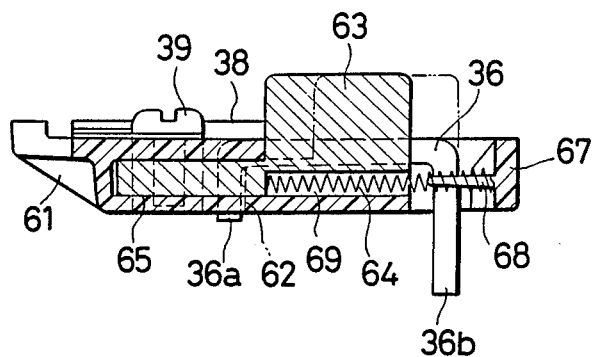
FIG. 18 is a sectional view taken along line XVIII—XVIII in FIG. 17.

This locking means, like that in the above embodiment, consists of a heart-like cam groove 30c provided in a piston rod 30 and a locking pin 36. As shown in FIGS. 16 and 18, however, the locking pin 36 is mounted in the recessed portion 19 of the case with its stem portion 36a rotatably supported in a bearing hole 62 of a base 61 and its tracing portion 36b at the other end penetrates the slot 15d formed in the central hollow rectangular portion 15a of the lower slide holder 15 from the through hole 37 of the recessed portion 19 and extending into the cam groove 30c of the piston rod 30. On one side portion of the base 61 are provided a weight 63 made of a metal and slidable in the longitudinal direction and a coil spring 64 biasing the weight 63 in a retreating direction.

Figure 17:
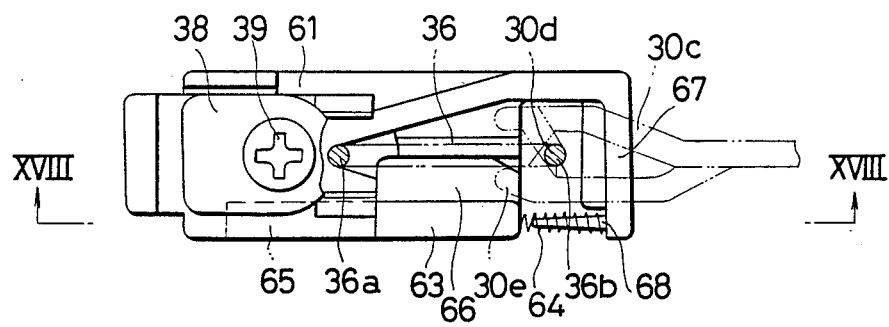
FIG. 17 is a plan view showing the locking means of FIG. 16 in an assembled state.
Figure 19:
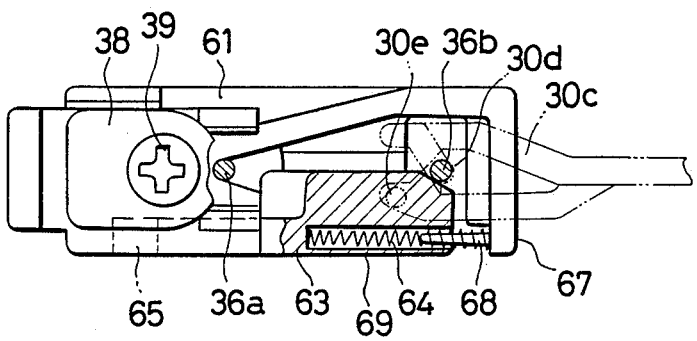
FIG. 19 is a plan view for explaining the operation of the locking means of FIG. 16.

More specifically, as shown in FIGS. 16 and 17, the weight 63 is inserted sidewise in a longitudinally elongate slide groove 65 formed in the base 61 along one side thereof and slidable along the slide groove 65 in the longitudinal direction thereof. The weight 63 has a sidewise projection 66 projecting from one side. When the weight 63 is in an advanced position, the sidewise projection 66 opposes sidewise the tracing portion 36b of the locking pin 36 to prevent a swing of the locking pin 36 in the releasing direction, i.e., displacement of the free end of the tracing portion 36b from a stop section 30d to an escapement section 30e of the cam groove 30c (FIG. 19).

The coil spring 64 has an end portion fitted on a pin-like projection 68, which projects from the inner surface of an end portion of an L-shaped extension of the base 61 into the slide groove 65, and the other end portion fitted in a groove 69 formed in the bottom of the weight 63, the spring 64 being thus compressed between the inner surface noted above and an end surface of the groove 69. The open bottom of the groove 69 of the weight 63 is closed by the upper surface of the slide groove 65 of the base 61 in frictional contact with the weight 63. The coil spring 64 thus is never detached from but is reliably retained in the groove 69 to bias the weight 63 and hold the weight 63 in the slide groove 65.

The upper slide holder 14 is forwardly pushed by the coil spring 27 via its piston portion 14c, while the lower slide holder 15 is forwardly pushed by the coil spring 34 via the piston rod 30. These two slide holders 14 and 15 are pushed to their most advanced positions, which are determined by stopper means. more specifically, as shown in FIGS. 7 and 9, the slide holders 14 and 15 are pushed to their most advanced positions such that the cassettes 11 held on their support surfaces 14' and 15' partly project from the opening 13 of the case 12 in a staircase-like fashion, that is, the cassettes 11 held by the upper slide holder 14 project to a smaller extent than the cassettes 11 held by the lower slide holder 15. More specifically, in this embodiment the most advanced position of the upper slide holder 14 is determined by a shoulder surface 40 provided in the opposite side wall inner surfaces of the case 12 and the rear surface of the recessed portion 19, so that the upper slide holder 14 is stopped at a position at which the leading end 14" of the upper slide holder 14 is in contact with the two surfaces noted above (FIGS. 8, 9 and 11). The most advanced position of the lower slide holder 15 is also determined by the shoulder surface 40. In this case, however, upright end surfaces 15c provided in a rear portion of the lower slide holder 15 are in contact with the shoulder surface 40. Thus, in its stopped position, the lower slide holder 15 projects to a greater extent than the upper slide holder 14 (FIGS. 9, 10 and 12). In this embodiment the stopper means, therefore, is constituted by the shoulder surface 40 of the case 12, rear surface of the recessed portion 19, front end 14" of the upper slide holder 14 and upright end surfaces 15c of the lower slide holder 15. The rear end of the transverse partition wall 18 defining the upper and lower spaces in the case 12 coincides with the shoulder surface 40 noted above.

As shown in FIGS. 3 and 7, the lid 17 is a thick plate member. It has a pair of, i.e., left and right, triangular ribs 41 projecting from its inner surface adjacent to the opposite sides. The ribs 41 have respective bearing holes 42, in which the left and right pins 16 of the lower side holder 15 are pivoted. A substantially central portion of the inner surface of the lid 17 is provided with a pivotal section 43 having a pair of, i.e., left and right, pins. To the pivotal section 43 is pivoted one end of a joint 44, the other end of which is pivoted at the pin section 30b of the piston rod 30 slightly rearwardly of the front end thereof, the piston rod 30 and lid 17 being thus coupled to each other. The lower surface of the joint 44 is provided with a leaf spring 45 extending in a rearwardly slanted direction. The leaf spring 45 has an effect of preventing the joint 4 from directly striking the inner surface 17' of the lid 7 when the lid 17 is turned down to open the opening 13. The top of the hollow rectangular portion 15a adjacent to the front end thereof is formed with a slit which permits the joint 44 to be upwardly tilted or become horizontal.

Reference numeral 46 in FIGS. 3 and 7 designates a joint cover covering the joint 44. The distance between each side surface of the joint cover 46 and the inner surface of the corresponding rib 41 of the lid 17 with the joint cover 46 fitted is set to be substantially equal to the width of the cassettes 11. The ribs 41 and joint cover 46 thus serve as a guide means that determines the direction in which a cassette 11 is inserted or taken out. Reference numeral 47 designates a coil spring biasing the joint cover 46 to be pulled toward the lid 17.

Figure 13:
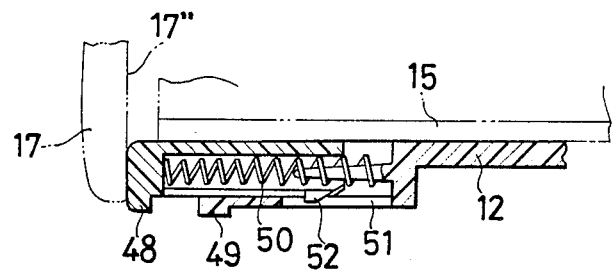
FIG. 13 is a fragmentary sectional view, showing the lid held upright by an urging member.
Figure 14:
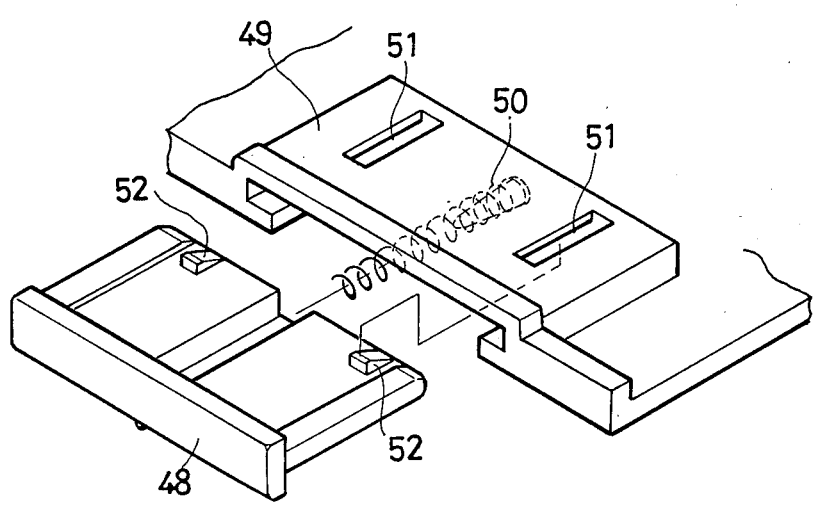
FIG. 14 is a fragmentary exploded perspective view showing the urging member of FIG. 13 in an inverted state.
Figure 15:
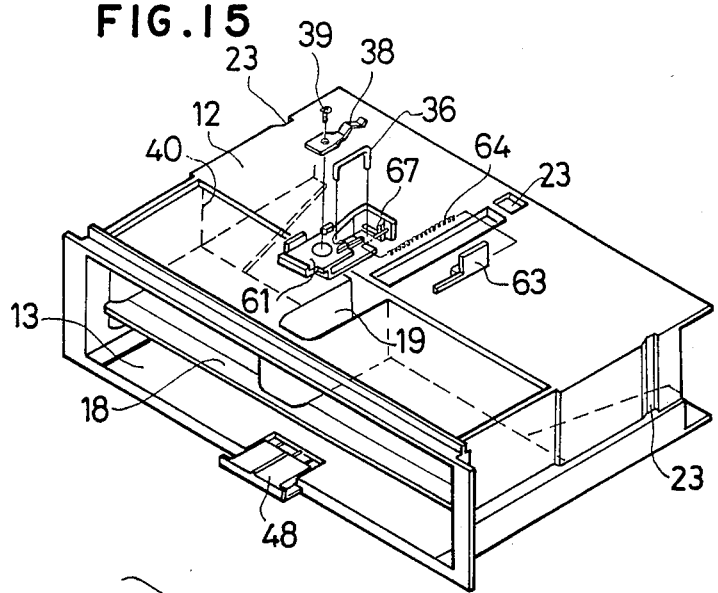
FIG. 15 is a perspective view showing a different example of the case of the apparatus according to the invention.

Reference numeral 48 in FIGS. 3, 13 and 14 designates an urging member for urging a portion of the inner surface 17' of the lid 17 lower than the pins 16 in the closed state of the lid 17. The urging member 48 is longitudinally slidably retained in a guide 49 provided substantially on the center of the bottom of the case 12. It is biased by a coil spring 50, which is compressed between it and the guide 49, in a direction to project forwardly from the guide 49 (FIG. 3). Reference numeral 51 in FIGS. 13 and 14 designates a pair of guide slots formed in the lower wall of the guide 49 and extending in the direction of sliding of the urging member 48, and numeral 52 a pair of pawls projecting from the lower surface of the urging member 48, the pawls 52 being received in the guide slots 51.

Reference numeral 53 in FIGS. 6, 9 and 12 designates a pair, i.e., left and right, of buttons, which extend through respective holes 54 formed in the rear wall of the lower slide holder 15 into the interior thereof to be in elastic contact with and forwardly push the rear surface of cassettes 11 in the lower slide holder 15. Each of the buttons 53 is slidably held in a cylinder-like button holder 55 secured to the cover member 22 and is biased by a coil spring 56 compressed between it and the rear end of the button holder 55. The outer periphery of a longitudinally intermediate portion of the button 53 has a flange-like portion 57 having a greater diameter than the inner diameter of the hole 54. When no cassette 11 is accommodated in the lower slide holder 15, the slide holder 15 itself can be urged forwardly via this flange-like portion 57. The button 53 has a pair of pawls provided on the rear end opposite sides, these pawls being received in longitudinal notches formed on the opposite sides of the button holder 55 and received by the front ends of the notches so that the button 53 will not be detached from the button holder 55.

The operation of the apparatus 10 will now be described. To open the case 12 from the closed state, the front surface of the lid 17 is slightly pushed by the hand, as shown in FIGS. 4 to 6.

As the lid 17 is pushed, the piston rod 30 is retreated via the joint 44. This retreat causes the locking pin 36 locked in the heart-like cam groove 30c of the piston rod 30 to be moved in the cam groove 30c, thus releasing the locked state. When the locked state is released, the piston portion 30a of the piston rod 30 is pushed forwardly by the restoring force of the coil spring 34 in the lower cylinder portion 21, so that the piston rod 30 is advanced.

This advancement of the piston rod 30 causes the lid 17 to be pushed forwardly and separated from the front surface of the case 12, as shown in FIG. 10, so that the lower slide holder 15 with the pins 16 thereof pivoted in the holes 42 in the ribs 41 of the lid 17 is advanced.

Subsequently, the lid 17 is turned down about the pins 16 to be gradually opened. The maximum opening angle is determined by an angle determination means. In this embodiment, the lid 17 is stopped when it is opened to a horizontal position, at which a lowermost portion 17" of the inner surface 17' of the lid 17 is in contact with the lower surface 15" of the lower slide holder 15 (FIGS. 8 and 9). At this open position of the lid 17, the inner surface 17' thereof lies substantially in the same plane as the support surface 15' of the lower slide holder 15 (FIG. 7).

The lower slide holder 15 is stopped at its most advanced position, at which the upright end surfaces 15c are in contact with the shoulder surface 40 of the case 12 (FIGS. 8 and 9 and left side of FIG. 12).

Further, the advancement of the piston rod 30 causes air to be drawn into the lower cylinder portion 21 through the orifice 35. Thus, a braking force is produced, so that the piston rod 30 and lower slide holder 15 are advanced quietly and also the lid 17 is opened quietly. Further, when the lid 17 is opened, the leaf spring 45 of the joint 44 is brought into elastic contact with the inner surface 17' of the lid 17 and provides a cushioning effect. The lid 17 is thus opened even more quietly.

When the upper slide holder 14 is accommodating a cassette 11 on at least one of the left and right holding portions 14b, the front surface of the cassette case 11 is urged against the inner surface 17' of the closed lid 17 by the coil spring 27, so that the upper slide holder 14 is at its retreated position. Therefore, when the lid 17 is opened, the upper slide holder 14 is advanced with the cassette 11 held on the holding portion 14b by the restoring force of the coil spring 27 to its most advanced position, at which the front end 14" is in contact with the shoulder surface 40 of the case 12 and rear surface of the recessed portion 19 (FIGS. 8 and 9 and broken lines in FIG. 11).

Further, when the upper slide holder 14 is advanced, the O-ring 25 on the piston portion 14c is moved rearwardly along the annular groove 26 in frictional contact with the inner wall surface of the cylinder portion 20, thus closing and sealing the exhausting passage 26'. The upper cylinder portion 20 which has thus been sealed withdraws controlled air through the orifice 28. Thus, a braking force is produced, and the upper slide holder 14 is advanced slowly and quietly.

When no cassette 11 is accommodated in the upper slide holder 14, the holder 14 is biased forwardly by the restoring force of the coil spring 27, so that it is at its most advanced position, with its front end 14" in contact with the shoulder surface 40 and recessed portion 19 as noted above. The holder 14 thus is held in this state even when the lid 17 is opened.

When the lid 17 is opened, a cassette 11 may be inserted into each of the holders 14 and 15 from the opening 13 of the case 12. In this embodiment, a total of four cassettes 11 can be loaded.

When loading a cassette 11 in the upper slide holder 14, the cassette 11 may be pushed forward with its end placed on the upper surface of the transverse partition wall 18 of the case 12. When the cassette 11 is pushed, it is partly transferred from the partition wall 18 onto the support surface 14' of the upper slide holder 14 and is stopped at a position at which the rear surface of the cassette is in contact with the rear wall of the upper slide holder 14 (FIG. 9).

When loading a cassette 11 in the lower slide holder 15, the cassette 11 may only be pushed toward the depth of the holder along the inner surface 17' of the lid 17 because the inner surface 17' lies substantially in the same plane as the support surface 15' of the lower slide holder 15. At this time, the cassette 11 is positioned between one rib 41 of the lid 17 and the joint cover 46. When the cassette 11 is pushed in this way, the direction of insertion of the cassette 11 is determined by the rib 41 and joint cover 46. The lower surface of the cassette is thus transferred onto the support surface 15' of the lower slide holder 15, lying substantially in the same plane as the inner surface 17' of the lid 17, and the cassette is stopped at a position, at which the rear surface is in contact with the rear wall of the lower slide holder 15 (FIG. 9).

When cassettes 11 are loaded in the two slide holders 14 and 15, the front end portions of the upper and lower cassettes 11 project in a staircase-like fashion (FIGS. 7 and 9).

To accommodate the cassettes 11 in the case 12, the lid 17 is raised and pushed toward the case 12 with the hand.

When the lid 17 is raised, it is turned about the pins 16 to the upright state, thus causing a slight retreat of the piston rod 30. When the lid 17 is pushed subsequently, the lower slide holder 15 and piston rod 30 are both retreated. Subsequently, the front surface of the cassettes 11 loaded in the upper slide holder 14 is urged by the inner surface 17' of the lid 17, so that the upper slide holder 14 and the piston portion 14c are retreated likewise.

When the inner surface 17' of the lid 17 is brought into contact with the front end of the case 12, the lid 17 can no longer be pushed, so that it is released. As a result, it is pushed back by the restoring force of the coil spring 34 acting on the piston rod 30. With a slight retreat of the lid 17, however, the locking pin 36 is engaged in the cam groove 30c of the piston rod 30 to stop the piston rod 30 having been pushing back the lid 17. This lid 17 thus held upright at a position slightly spaced apart from the opening 13 of the case 12 (FIGS. 5, 6 and 13).

When closing and pushing the lid 17 in this way, the cylinder portions 20 and 21 provide no braking force. Thus, the lid 17 can be pushed without need of exerting any extra force.

More specifically, in a step of retreat of the piston portion 14c of the upper slide holder 14, the O-ring 25 is advanced in the annular groove 26 to open the exhausting passage 26', air in the upper cylinder portion 20 is exhausted to the outside through the exhausting passage 26'. The outer diameter of the flange-like portions at the front and rear ends of the annular groove 26, therefore, is preferably set to be slightly smaller than the inner diameter of the cylinder portion 20.

Likewise, in the step of retreat of the piston portion 30a of the piston rod 30, air in the lower cylinder portion 21 is exhausted to the outside through the check valve 31. Therefore, no braking action is provided when closing the lid 17 or pushing the lid 17.

When the lid 17 is upright, a portion of the inner surface 17' lower than the pins 16 is forwardly pushed by the urging member 48. Thus, when cassettes 11 are loaded in the slide holders 14 and 15, the inner surface 17' of the lid 17 is brought into contact with the front surface of each cassette 11. Thus, the lid 17 will not rattle even when external vibration is transmitted to it (FIGS. 5 and 13).

This is so because there is a slight gap between the lid 17 and the front edge of the case 12 for pushing the lid 17 to take out the case 11, and this gap prevents the inner surface 17' of the lid 17 from striking the front end of the case 12 when the lid 17 is turned down about the pins 16.

Further, the cassettes 11 inside the case 12 will not rattle even when external vibration is transmitted to the apparatus 10. More specifically, this is so because the cassettes 11 in the upper slide holder 14 are normally urged against the inner surface 17' of the lid 17 by the coil spring 27 acting on the upper slide holder 14, so that back-and-forth movement of the cassettes 11 is prevented (FIG. 5).

In the lower slide holder 15, the rear surface of the cassettes 11 is forwardly urged by the buttons 53 projecting into the lower slide holder 15 through the holes 54 so that the front surface of the cassettes 11 is urged against the inner surface 17' of the lid 17. Thus, back-and-forth movement of the cassettes 11 is prevented likewise.

Further, the slide holders 14 and 15 will not rattle in the case 12 even when no cassette 11 loaded in the slide holders 14 and 15.

More specifically, when no cassette 11 is loaded in the upper slide holder 14, this holder 14 is advanced by the coil spring 27 and held urged at its most advanced position as shown by the broken lines in FIG. 11 so that it cannot be moved back and forth. Therefore, it will not rattle even when external vibration is transmitted to it.

When there is no cassette 11 in the lower slide holder 15, the holder 15 is urged forwardly by the flange-like portions 57 of the buttons 53, and its end is urged against the inner surface 17' of the lid 17, so that it cannot be moved back and forth. Therefore, it will not rattle even when external vibration is transmitted to it.

When taking out the cassette 11, the lid 17 which is held upright at a position slightly spaced apart from the front end of the case 12 is slightly pushed by the hand in the manner as described above. As a result, the lid 17 is advanced and forwardly turned down to the open state, causing the front portions of the cassettes 11 to project from the opening 13 in a staircase-like fashion. Thus, the desired cassette 11 can be easily taken out by grasping its projecting portion. Further, a cassette 11 can be easily loaded in an empty space.

In the above embodiment, the box-like articles are cassettes 11 for cassette tapes. However, according to the invention it is possible to accommodate as box-like articles cassette halves, video tapes, tapes for digital audio tape recorders, tape cases thereof or disk cases for compact disks and floppy disks.

Further, the apparatus is not limited to one mounted in a car, but may be of the type built into audio or office equipment or of general furniture type.

Further, the coil springs 27 and 34 of the biasing means may be replaced with leaf springs. Further, while in the above embodiment the cassettes 11 are biased indirectly via the slide holders 14 and 15, it is possible to directly bias the cassettes 11 using locking means as illustrated in FIG. 20. To be specific, the locking means is provided on a cover 22 for the rear end of a case 12 having a front opening 13 and comprises a piston rod 30 having a strike 71 at the leading end thereof and forming a heart-like cam groove 30c in an intermediate portion of the length thereof, a cylinder 73 for retaining the piston rod 30 and permitting the piston rod 30 to slide therein, a locking pin 36 having one end thereof supported pivotally on the cylinder 73 and the other end thereof tracing the cam groove 30c, and a coil spring 72 inserted about the piston rod 30 for biasing the strike 71 in the forward direction. The number of the locking means corresponds to that of spaces defined in the case 12 by partition walls 18. When a cassette 11 is pushed into the space it is accommodated within the space and, when the cassette is further pushed into the space, it is projected from the front opening 13 of the case 12 by the action of the strike 71 biased by the coil spring 72. By setting the position of the lower locking means more forward than that of the upper locking means it is possible to take the lower cassette 11 out of the case 12 more easily. Further, denoted by reference numeral 70 in FIG. 20 is a leaf spring having a center expanded portion for biasing the cassette 11 in the lateral direction to prevent the cassette 11 from rattling within the space of the case 12. Further, it is possible to accommodate any desired number of slide holders of either horizontal or vertical type.

Further, while in the above embodiment the locking means capable of releasing consists of the heart-like cam groove 30c of the piston rod 30 and locking pin 36 for tracing the groove, it is possible to construct locking means using a hook and a locking pin having the same function.

As has been described in the foregoing, according to the invention box-like articles are completely accommodated in the case in their stored state, which is desirable in view of appearance. Further, when taking out an accommodated box-like article, by merely pushing it, it can be projected to a state that it can be readily taken out. It is thus possible to provide a box-like article accommodation apparatus which permits very easy and ready insertion and removal of box-like articles.

Further, the number of box-like articles that can be accommodated can be freely selected by appropriately selecting the positions and interval of partition walls of the case, while a neat appearance is presented after the box-like articles are completely accommodated in the case. Further, the individual stored box-like articles can be easily taken out at the time they are projected from the case opening in a staircase-like fashion.

Further, when the box-like articles are stored, the case opening is closed by the lid in the upright state so that dust is shut out from the case, and a neat appearance is presented.

Further, the lid is slidingly opened together with the slide holders in response to an operation of merely slightly pushing it, so that a high class impression can be obtained. Furthermore, when the lid is fully opened, the inner surface thereof lies in the same plane as the slide holder support surface, permitting smooth loading and removal of a box-like article. Further, as noted above the operation of the lid and slide holders is performed in a manner controlled by the air dampers, so that it can be performed smoothly and quietly.

Further, the locking means is provided with release prevention means, so that it is possible to provide a highly safe article accommodation apparatus, which is free from accidental turn-down of the lid to cause forward projection of slide holders from the case opening even when a momentum is exerted on the slide holders due to a sudden stopping of the motor car or like causes.

What is claimed is:

1. An apparatus for accommodating box-like articles comprising a case open at least at the front, a slide holder slidably accommodated in said case for supporting on a support surface a box-like article inserted into said case through said front opening, a lid pivotably coupled to the front end of said slide holder for opening and closing said front opening, said lid being forwardly pivotally turned down about the point of its pivotal support to open said front opening, biasing means for forwardly urging said slide holder and lid together, locking means for locking said slide holder in a retreated position in said case against the biasing force of said biasing means and also locking said lid in an upright state closing said front opening of said case, stopper means for restricting the foremost position of said slider holder pushed out by the biasing force of said biasing means, and angle restriction means for restricting the maximum open angle of said lid when the inner surface of said lid having been forwardly turned down lies substantially in the same plane as said support surface of said slide holder wherein said locking means includes a cylinder secured to said case, a piston rod slidable in said cylinder and being connected with said lid, said piston rod being biased toward the front end having a heart-like cam groove formed in the upper surface of an intermediate portion in the length thereof, and a locking pin having a stem portion secured to said case and a tracing portion extending to swing along said cam groove, wherein the engagement of said tracking portion in said cam groove holds said slide holder in a retreated position.

2. The apparatus according to claim 1, which further comprises an air damper for braking the movement of said slide holder caused by said biasing means and/or movement of said lid being opened.

3. The apparatus according to claim 1, which further comprises an urging member provided on the front edge of said case for forwardly urging a portion of the inner surface of said lid in the upright state thereof lower than said pivotal support point thereof.

4. The apparatus according to claim 1, wherein said lid is provided on the inner surface thereof adjacent to the opposite sides with a pair of projecting ribs.

5. The apparatus according to claim 4, wherein said lid is provided on the central inner surface thereof with a pivotal section on which one end of a joint having the other end thereof attached pivotally to the front end of said piston rod is pivotally supported.

6. An apparatus for accommodating box-like articles comprising:
a case open at least at the front;
a slide holder slidably accommodated in said case for supporting on a support surface a box-like article inserted into said case through said front opening;
a lid pivotably coupled to the front end of said slide holder for opening and closing said front opening, said lid being forwardly pivotally turned down about the point of its pivotal support to open said front opening;
biasing means for forwardly urging said slide holder and lid together;
locking means for locking said slide holder in a retreated position in said case against the biasing force of said biasing means and also locking said lid in an upright state closing said front opening of said case, said locking means including a cylinder secured to said case, a piston rod slidable within said cylinder, the top of said rod being connected with said lid, said rod being biased toward the front and having a heart-like cam groove formed in the upper surface of an intermediate portion in the length thereof, a locking pin having a stem portion rotatably fixed to said case and a tracing portion protruded into said cam groove, said locking pin locking said holder in said retreated position as well as retaining said lid in said upright state in a locking position of said cam groove and advancing said slide holder while forwardly turning down said lid in a releasing position of the cam groove; and
safety means for preventing the releasing action of the locking pin which is in the locking position of said cam groove when said slide holder experiences a momentum.

7. The apparatus according to claim 6, wherein said safety means comprises a weight slidable along one side of said locking pin and impeding a swing action of the tracing portion along said cam groove when said weight is in an advanced position, and a coil spring normally biasing said weight in a retreated position.

8. Locking means comprising:
a cylinder secured to a case;
a piston rod slidable within said cylinder and having a heart-like cam groove formed in the upper surface of an intermediate portion in the length thereof;
spring means forwardly biasing said piston rod;
a U-shaped locking pin having a stem portion rotatably fixed to said case and a tracing portion protruded into said heart-like cam groove, said locking pin locking said piston rod within said cylinder against the biasing force of said spring means in a locking position of said cam groove and protruding said piston rod from the inside of said cylinder by the biasing force in a releasing position of said cam groove;
a weight slidable along one side of said locking pin and impeding an action of said locking pin which is in the locking position of said cam groove when said weight is in an advanced position; and
a coil spring normally biasing said weight in a retreated position.

9. The apparatus according to claim 5, wherein said joint is covered by a joint cover which, in cooperation with said pair of projecting ribs, constitutes a guide means that determines the direction in which the box-like articles are inserted.

* * * * *